US011964272B2

(12) United States Patent
Wang et al.

(10) Patent No.: US 11,964,272 B2
(45) Date of Patent: Apr. 23, 2024

(54) DETECTION CHIP, PREPARATION METHOD AND USE METHOD THEREOF, AND DETECTION DEVICE

(71) Applicant: BOE Technology Group Co., Ltd., Beijing (CN)

(72) Inventors: Chenyu Wang, Beijing (CN); Yufan Zhang, Beijing (CN); Jing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 430 days.

(21) Appl. No.: 17/348,662

(22) Filed: Jun. 15, 2021

(65) Prior Publication Data

US 2022/0062889 A1 Mar. 3, 2022

(30) Foreign Application Priority Data

Aug. 27, 2020 (CN) ......................... 202010877864.7

(51) Int. Cl.
*B01L 3/00* (2006.01)

(52) U.S. Cl.
CPC ......... *B01L 3/5027* (2013.01); *B01L 2200/10* (2013.01); *B01L 2400/0406* (2013.01)

(58) Field of Classification Search
CPC ............... B01L 3/5027; B01L 2200/10; B01L 2400/0406; B01L 2200/027; B01L 2200/16; B01L 2300/0672; B01L 2400/0481; B01L 2400/0683
See application file for complete search history.

(56) References Cited

U.S. PATENT DOCUMENTS

| | | | | |
|---|---|---|---|---|
| 5,096,669 A * | 3/1992 | Lauks | ............... B01L 3/502715 324/438 |
| 9,410,663 B2 | 8/2016 | Wright et al. | |
| 2004/0132218 A1 | 7/2004 | Ho | |
| 2004/0152206 A1 | 8/2004 | Davis et al. | |
| 2010/0068097 A1* | 3/2010 | Ade | .................. B29C 66/81435 277/630 |
| 2013/0343955 A1* | 12/2013 | Doyle | ................... B01L 3/5055 422/68.1 |

FOREIGN PATENT DOCUMENTS

| | | |
|---|---|---|
| CN | 206965753 U | 2/2018 |
| CN | 108295912 A | 7/2018 |
| CN | 109999931 A | 7/2019 |
| CN | 210585000 U | 5/2020 |
| CN | 111389475 A | 7/2020 |
| WO | 2016083550 A1 | 6/2016 |

OTHER PUBLICATIONS

CN202010877864.7 first office action.

* cited by examiner

*Primary Examiner* — Dennis White
(74) *Attorney, Agent, or Firm* — IPro, PLLC

(57) ABSTRACT

Disclosed are a detection chip, a preparation method and use method thereof, and a detection device. The detection chip comprises a substrate and a reservoir chamber. The reservoir chamber is configured to contain a liquid and comprises a support frame, and a first seal layer and a second seal layer for sealing the support frame. The support frame comprises a support frame body and a cavity formed in the middle of the support frame body. The second seal layer is configured to be concaved into the cavity. The substrate comprises a piercing structure.

20 Claims, 4 Drawing Sheets

DETECTION CHIP, PREPARATION METHOD AND USE METHOD THEREOF, AND DETECTION DEVICE

CROSS REFERENCE TO RELEVANT APPLICATIONS

The disclosure claims priority to Chinese Patent Application No. 202010877864.7, entitled "DETECTION CHIP, PREPARATION METHOD AND USE METHOD THEREOF, AND DETECTION DEVICE", filed with the China National Intellectual Property Administration on Aug. 27, 2020, which is incorporated herein by reference in its entirety.

TECHNICAL FIELD

The embodiments of the disclosure relate to a detection chip, a preparation method and use method thereof, and a detection device.

BACKGROUND

The micro-fluidic chip technique may automatically complete a whole reaction and analysis process by integrating basic operation units for sample preparation, reaction, separation and detection in biological, chemical and medical fields on a chip with a micro-channel on the micrometer scale. The chip used in this process is called a micro-fluidic chip, referred to as a Lab-on-a-chip. The micro-fluidic chip technique has the advantages of being low in sample consumption, high in analysis speed, beneficial to fabrication of portable instruments, suitable for instant field analysis, and the like, thus having been widely applied to the biological, chemical and medical fields as well as many other fields.

SUMMARY

At least one embodiment of the disclosure provides a detection chip, comprising:

a substrate comprising a piercing structure; and a reservoir chamber configured to contain a liquid and comprising a support frame, and a first seal layer and a second seal layer for sealing the support frame;

wherein, the support frame comprises a support frame body and a cavity formed in the middle of the support frame body; and the second seal layer is configured to be concaved into the reservoir chamber.

Optionally, a contour of the second seal layer is approximately shaped like a hemisphere that is concaved into the reservoir chamber.

Optionally, the second seal layer comprises a polymer layer and a metal layer.

Optionally, the second seal layer comprises an aluminum film and a PE polymer layer.

Optionally, the second seal layer comprises a metal film.

Optionally, the first seal layer is a flexible polymer film and is configured to deform when pressed.

Optionally, the PE polymer layer has a thickness of 0.001 mm to 1 mm, and the aluminum film has a thickness of 0.001 mm to 1 mm.

Optionally, the substrate further comprises a connecting portion that is configured to be connected to the reservoir chamber.

Optionally, the connecting portion comprises a bump with a circular cross-section, and a height of the bump is greater than a concave depth of the second seal layer.

Optionally, the piercing structure is a needle tip, and a distance from a top end of the needle tip to a surface, away from the substrate, of the bump is smaller than the concave depth of the second seal layer.

Optionally, the reservoir chamber is fixedly connected to the bump and is coaxially aligned with the bump.

Optionally, the piercing structure is located at a center of the cross-section shape of the connecting portion.

Optionally, the piercing structure is a needle tip.

Optionally, the piercing structure is formed with a micro-channel opening that is configured to be communicated with a micro-channel in the substrate.

Optionally, in case where the detection chip is used for immunological detection, the substrate is made of PS or PMMA; or in case where the detection chip is used for molecular detection, the substrate is made of PP or PC.

At least one embodiment of the disclosure provides a detection device, comprising:

the above detection chip; and a force application mechanism configured to apply a force towards an internal space of the reservoir chamber to the first seal layer of the reservoir chamber of the detection chip to enable the second seal layer to deform to be pierced by the piercing structure.

At least one embodiment of the disclosure provides a method for operating the above detection chip, comprising:

applying a force towards an internal space of the reservoir chamber to the first seal layer of the reservoir chamber of the detection chip to enable the second seal layer to deform to be pierced by the piercing structure.

At least one embodiment of the disclosure provides a preparation method of the above detection chip, comprising:

pre-deforming the second seal layer to make the reservoir chamber; and providing the substrate comprising a connecting portion, and fixing the reservoir chamber to the connecting portion.

Optionally, the step of pre-deforming the second seal layer comprises:

fixing the second seal layer to the support frame body to cover the cavity;

suspending a slide bar in a vertical direction of the second seal layer, wherein the vertical direction is a direction perpendicular to a surface of the second seal layer; and controlling the slide bar to move cyclically along a preset track to enable the second seal layer to be concaved into the cavity, wherein the preset track is a motion track of the slide bar after an end of the slide bar presses against the surface of the second seal layer.

Optionally, further comprising:

pre-deforming the second seal layer by a hot-pressing or hot-extrusion process.

The aforesaid description is merely a brief summary of the technical solution of the disclosure. To allow those skilled in the art to gain a better understanding of the technical means of the disclosure so as to implement the disclosure according to the contents in the specification and to make the above and other purposes, features and advantages of the disclosure clearer, specific implementations of the disclosure are given below.

BRIEF DESCRIPTION OF THE DRAWINGS

To more clearly explain the technical solutions of the embodiments of the disclosure, drawings of the embodiments will be briefly introduced below. Obviously, the drawings in the following description only relate to some embodiments of the disclosure, and are not intended to limit the disclosure.

DETAILED DESCRIPTION

To make the purposes, technical solutions and advantages of the embodiments of the disclosure clearer, the technical solutions of the embodiments of the disclosure will be clearly and comprehensively described below in conjunction with the drawings of the embodiments. Obviously, the embodiments in the following description are merely illustrative ones, and are not all possible ones of the disclosure. All other embodiments obtained by those ordinarily skilled in the art based on the following ones without creative labor should also fall within the protection scope of the disclosure.

Unless otherwise defined, all technical terms or scientific terms in this disclosure should have ordinary meanings understood by those with common skills in the art. “First”, “second” and similar terms in this disclosure do not indicate any sequence, quantity or relative importance, and are merely used to distinguish different constituent parts. Similarly, “one”, “a/an”, “said” and other similar terms do not indicate a quantitative limitation, and only indicate the existence of at least one. “Comprise”, “include” or other similar terms are intended to point out that an element or object appearing before the term contains an element or object or equivalents thereof listed after the term, and shall not exclusive of other elements or objects. “Connection”, “connect” or other similar terms are not limited to physical or mechanical connection, and may also refer to direct or indirect electrical connection. “Upper”, “lower”, “left” or “right” is merely used to indicate a relative positional relation, and when the absolute position of an object referred to is changed, this relative positional relation may change correspondingly.

Existing micro-fluidic chips pre-store a liquid reagent generally through a reagent storage structure and quantitatively release the liquid reagent when needed. The reagent is pre-stored in a sealed space and is isolated from the outside to be preserved for a long time; and when the chip works, the sealed space will be destroyed to allow the reagent to be quantitatively released. Whether a micro-fluidic chip is suitable for quantitative analysis of a detection result depends on whether this chip is capable of quantitatively releasing a reagent pre-stored therein.

To solve at least one of the above-mentioned problems, at least one embodiment of the disclosure provides a detection chip that is capable of quantitatively releasing liquids stored therein and is simple in structure and preparation process and low in cost.

It should be understood that the detection chip provided by the embodiments of the disclosure may be, but not limited to, a micro-fluidic chip.

Figure 1:
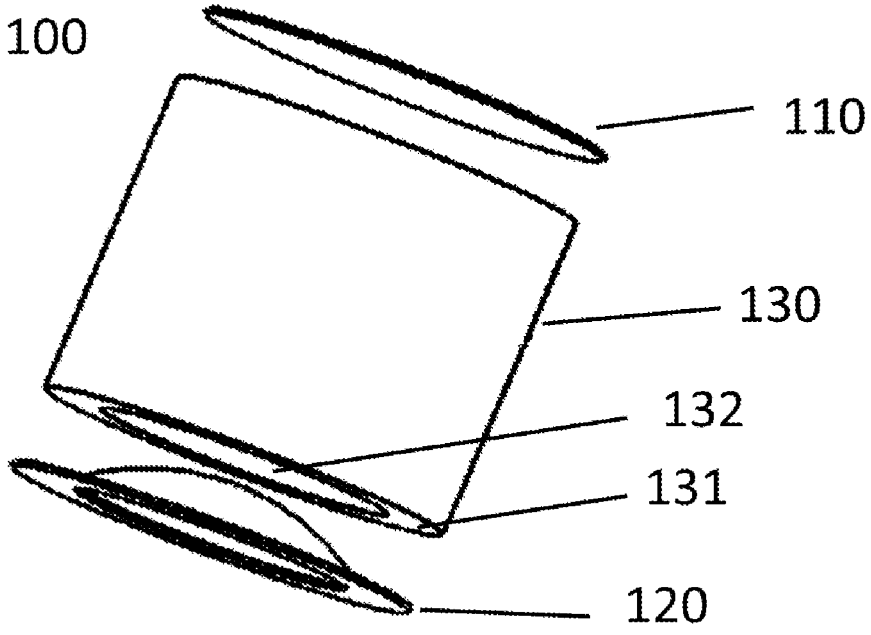
FIG. 1 is a perspective view of a reservoir chamber of a detection chip according to at least one embodiment of the disclosure.

At least one embodiment of the disclosure provides a detection chip. The detection chip comprises a substrate 200 and a reservoir chamber 100. The substrate may be a chip substrate. The reservoir chamber 100 comprises a support frame 130, and a first seal layer 110 and a second seal layer 120 for sealing the support frame 130. The support frame 130 comprises a support frame body 131 and a cavity 132 formed in the middle of the support frame body 131. Wherein, the second seal layer 120 is configured to be concaved into the cavity 132. The second seal layer 120 is pre-deformed, so that an external drive force for turning and deforming is reduced, and reagent residues caused by wrinkles on the seal layer is reduced to realize quantitative release. FIG. 1 is a perspective view of the reservoir chamber of the detection chip according to at least one embodiment of the disclosure, FIG. 2 is a perspective view of the substrate of the detection chip according to at least one embodiment of the disclosure, and FIG. 3 is a schematic diagram of the detection chip during use according to at least one embodiment of the disclosure.

The detection chip provided by some embodiments of the disclosure will be described below in conjunction with FIG. 1-FIG. 3.

Figure 2:
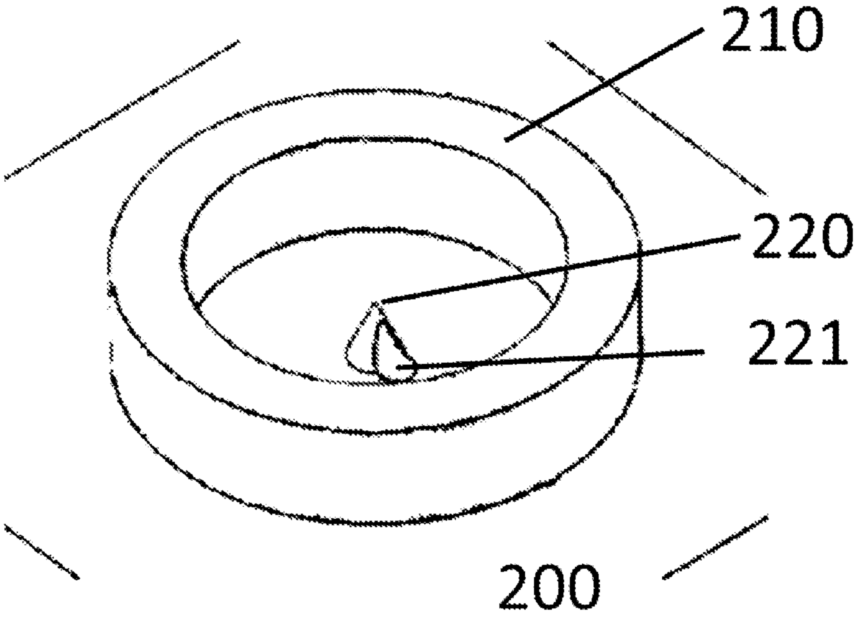
FIG. 2 is a perspective view of a substrate of a detection chip according to at least one embodiment of the disclosure.
Figure 3:
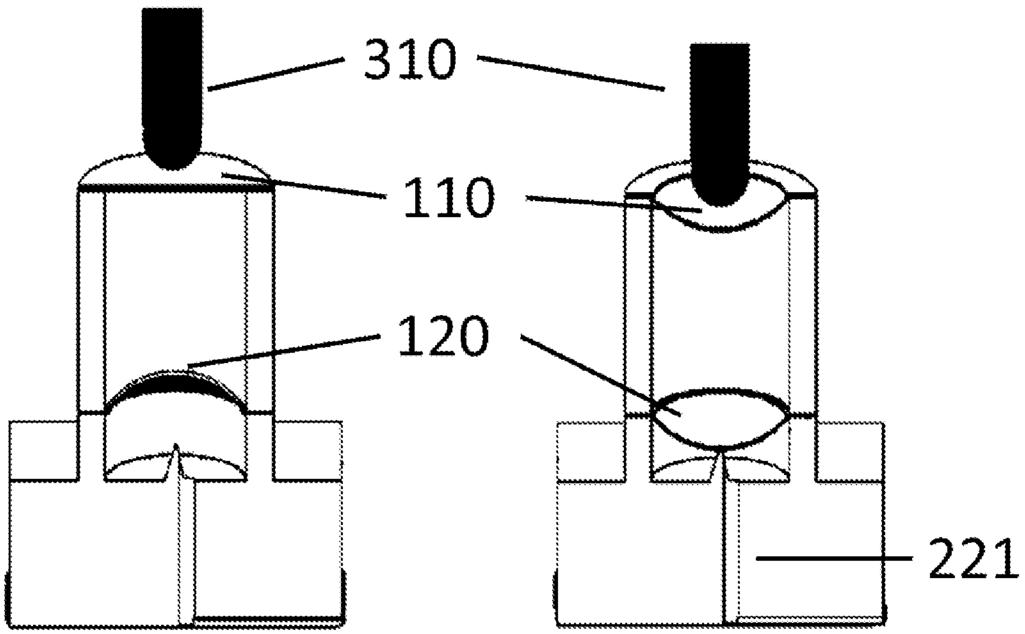
FIG. 3 is a schematic diagram of a detection chip during use according to at least one embodiment of the disclosure.

As shown in FIG. 1-FIG. 3, the detection chip comprises a substrate 200 and a reservoir chamber 100, wherein the substrate 200 comprises a connecting portion connected to the reservoir chamber 100.

The substrate 200 may be made of any appropriate materials as actually needed, such as glass, silicon, quartz, polyethylene terephthalate (PET), polystyrene (PS), poly (methyl methacrylate) (PMMA), polypropylene (PP), polycarbonate (PC), or a combination thereof, and the embodiments of the disclosure have no limitation in this aspect. For example, when the detection chip is used for immunological detection, the substrate 200 may be made of PS or PMMA; or, when the detection chip is used for molecular detection, the substrate 200 may be made of PP or PC.

As shown in FIG. 1, the reservoir chamber 100 comprises a support frame 130, and a first seal layer 110 and a second seal layer 120 for sealing the support frame 130, wherein the support frame 130 comprises a support frame body 131 and a cavity 132 formed in the middle of the support frame body 131, and a biochemical reagent is stored in the cavity 132 in the support frame body 131 and is sealed by the first seal layer 110 and the second seal layer 120.

For example, the first seal layer 110 is a flexible film made of polymer materials, has certain elasticity and strength, and is able to deform under an external drive force to apply a positive pressure to one part of the cavity 132 in the middle of the support frame body 131 sealed by the first seal layer 110. For example, the second seal layer 120 is a flexible composite film consisting of a polymer layer and a metal layer, wherein the polymer layer is flexible and ductile and endows the composite film with ductility and deformability, and the metal layer, as a support layer of the composite film, endows the composite film with certain plasticity, so that the second seal layer 120 can be maintained in a deformed state for a long time when deformed under an external force.

For example, the second seal layer 120 may be pre-deformed to be concaved inwards and has ductility and plasticity, so that the shape of the second seal layer 120 can be maintained for a long time after the second seal layer 120 is pre-deformed. For example, the contour of the second seal layer 120 is approximately shaped like a hemisphere that is concaved towards the interior of the reservoir chamber 100. It can be understood that the approximately hemispherical shape of the second seal layer 120 refers to an arc concave shape similar to a spherical concave contour. For example, the concave depth of the second seal layer 120 after pre-deformation is not equal to the radius of the outer contour of a pre-deformed portion of the second seal layer 120. For example, the contour of the second seal layer 120 after pre-deformation is in a square shape that is concaved towards the interior of the reservoir chamber 100. Of course, the embodiments of the disclosure are not limited to this, and the second seal layer 120 may also be in other suitable shapes. It can be understood that the concave depth of the second seal layer 120 depends on the material property of the second seal layer 120 and the specific size of the support frame 130 of the reservoir chamber. For example, the thicker the polymer layer in the second seal layer 120, the greater the concave depth of the second seal layer 120, under the condition that the composite film is not broken when pre-deformed. For example, the concave depth of the second seal layer 120 caused by pre-deformation is 0.1 mm to 8 mm.

For example, in case where a force towards the interior of the reservoir chamber 100 is applied to the first seal layer 110 by means of an ejection rod, the first seal layer 110 is able to deform elastically to allow the ejection rod 310 to move by a certain distance, and then the second seal layer 120 is deformed under the effect of compressed air to turn to a convex shape from the concave shape. Because the second seal layer 120 has certain plasticity, it can be maintained in the deformed state for a long time after the force applied by the ejection rod 310 is removed. It can be understood that because the second seal layer 120 is concaved towards the interior of the reservoir chamber 100, an external drive force for turning and deforming the second seal layer 120 will be much smaller, compared with a planar design.

For example, the first seal layer 110 may be made of polyethylene terephthalate (PET) to have good elasticity and strength. Of course, the embodiments of the disclosure are not limited to this, and the first seal layer 110 may also be made of other suitable materials such as polystyrene (PS) and PET polymer composite materials to have better elasticity and strength.

For example, the second seal layer 120 is a film consisting of a polyethylene (PE) polymer layer and an aluminum film, the composite film has certain ductility by means of the PE polymer layer on the surface of the aluminum film, and the PE polymer layer will not react with the biochemical reagent and is disposed on one side of the cavity sealed by the composite film, so that the reagent can be preserved for a long time. For example, the second seal layer 120 may be a metal film. Of course, the embodiments of the disclosure are not limited to this, and the second seal layer 120 may also be made of other suitable materials.

For example, the ratio of the thickness of the PE polymer layer to the thickness of the aluminum film in the second seal layer 120 determines the property of the composite film. For example, the larger the thickness of the PE polymer layer and the smaller the thickness of the aluminum film, the better the ductility of the second seal layer, and the greater the deformability of the second seal layer; the smaller the thickness of the polymer layer and the larger the thickness of the aluminum film, the better the plasticity of the second seal layer, and the second layer can be maintained in a specific shape for a long time. For example, the thickness of the PE polymer layer ranges from 0.001 mm to 1 mm, and the thickness of the aluminum film ranges from 0.001 mm to 1 mm. For example, the thickness of the PE polymer layer is 0.005 mm, the thickness of the aluminum film is 0.003 mm, and in this case, the second seal layer 120 can be pierced easily and can be maintained in the shape at the moment it is pierced for a long time after it is pierced.

The substrate shown in FIG. 1-FIG. 3 is provided with only one reservoir chamber 100. However, the embodiments of the disclosure are not limited to this. In other embodiments, the substrate may comprise any number of reservoir chambers 100 as actually needed, the reservoir chambers 100 are used to contain different reagents required for analysis and detection, may be in the same shape or different shapes, and may contain the same liquid or different liquids.

As shown in FIG. 1-FIG. 3, the detection chip comprises the substrate 200 and the reservoir chamber 100, wherein the connecting portion connected to the reservoir chamber 100 is disposed on the surface of the substrate 200. Optionally, the connecting portion may comprise a bump 210 with a circular cross-section, and the height of the bump 210 is greater than the concave depth of the second seal layer 120, so that the second seal layer 120 is able to turn from the concave shape to the convex shape in a cavity in the bump 210, and the bottom of the second seal layer 120 will not contact the substrate on the bottom surface of the bump 210 after the second seal layer 120 turns. It can be understood that the cross-section shape of the bump 210 corresponds to the cross-section shape of the support frame 130 of the reservoir chamber. Of course, the embodiments of the disclosure are not limited to this, and the cross-section shapes of the bump 210 and the support frame 130 may also be any other suitable shapes. It can be understood that the support frame 130 of the reservoir chamber and the bump 210 should be coaxially aligned before the detection chip starts to work to ensure that the inner-diameter center of the support frame 130 and the inner-diameter center of the bump 210 are located on the same straight line.

It can be understood that the substrate 200 may be made of any appropriate materials as actually needed, such as glass, silicon, quartz, ceramic, polyethylene terephthalate (PET), polystyrene (PS), poly(methyl methacrylate) (PMMA), polypropylene (PP), polycarbonate (PC) or a combination thereof. The embodiments of the disclosure have no limitation in this aspect.

For example, when the detection chip is used for immunological detection, the substrate 200 may be made of PS or PMMA; or, when the detection chip is used for molecular detection, the substrate may be made of PP or PC.

For example, the reservoir chamber 100 is fixed to the substrate 200 by threaded connection or clamped connection or in other fixed manners, and the support frame 130 of the reservoir chamber is coaxially aligned with the bump 210. For example, the bottom of the reservoir chamber 100 is bonded on the surface of the bump 210 to form a closed environment for later detection.

As shown in FIG. 2, a piercing structure is disposed on the surface of the substrate 200. For example, the piercing structure is located at the center of the cross-section shape of the connecting portion. It can be understood that the support frame 130 of the reservoir chamber, the bump 210 and the piercing structure should be coaxially aligned before the detection chip starts to work. For example, the piercing structure is a cylindrical structure such as a needle tip 220. For example, the needle tip is made of polypropylene (PP) through the injection molding process, and can be integrally injection-molded with the substrate 200 by designing a corresponding injection mold. Of course, the embodiments of the disclosure are not limited to this, and the needle tip may also be made through any suitable processes such as laser carving and lithography.

For example, in case where a force towards the interior of the reservoir chamber 100 is applied to the first seal layer 110 by means of the ejection rod 310, the first seal layer 110 is able to deform elastically to allow the ejection rod 310 to move by a certain distance, then the second seal layer 120 is deformed under the effect of compressed air to turn from the concave shape to the convex shape, the needle tip 220 pierces the second seal layer 120 at the top end of the convex hemisphere to form a break, and then the reagent in the reservoir chamber 100 is discharged along the hemispherical surface, so that reagent residues in the reservoir chamber 100 are reduced; and because the second seal layer 120 has certain plasticity, it can be maintained in the deformed state for a long time after the force applied by the ejection rod 310 is removed. It should be noted that the distance h2 from the top end of the needle tip 220 to the surface, away from the substrate 200, of the bump 210 should be smaller than the concave depth h1 of the second seal layer 120 to ensure that the second seal layer 120 contacts the needle tip 220 to be pierced after being turned during work.

Figure 4:
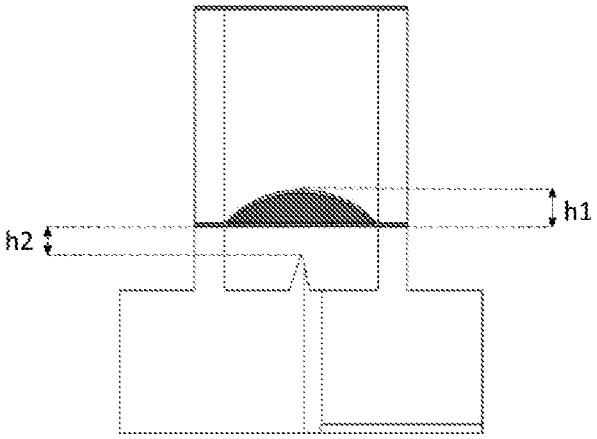
FIG. 4 is a sectional view of a detection chip according to at least one embodiment of the disclosure.

For example, as shown in FIG. 4, the distance h2 from the top end of the needle tip 220 to the surface, away from the substrate 200, of the bump 210 is slightly smaller than the concave depth h1 of the second seal layer 120. Specifically, "the distance h2 from the top end of the needle tip 220 to the surface, away from the substrate 200, of the bump 210 is slightly smaller than the concave depth h1 of the second seal layer 120" means that a difference between the distance h2 from the top end of the needle tip 220 to the surface, away from the substrate 200, of the bump 210 and the concave depth h1 of the second seal layer 120 ranges from 0.1 mm to 1 mm. For example, the inner diameter of the reservoir chamber 100 is 30 mm, the concave depth h1 of the hemispherical second seal layer 120 is 3 mm, the distance h2 from the top end of the needle tip 220 to the surface, away from the substrate 200, of the bump 210 is 2.5 mm, and in this way, the top end of the needle tip 220 pierces the second seal layer 120 when the second seal layer 120 turns to the convex shape from the concave shape; and because the second seal layer 120 is approximately a complete hemispherical structure after turning to be pierced, the reagent in the reservoir chamber 100 is discharged along the hemispherical surface, reagent residues in the reservoir chamber 100 are reduced, and quantitative release of the reagent is realized.

For example, the piercing structure is formed with a micro-channel opening that is configured to be communicated with a micro-channel 221 in the substrate 200; and when the piercing structure pierces the second seal layer 120, the reagent in the reservoir chamber 100 flows into the detection chip along the break via the micro-channel opening in the piercing structure. The working principle of the detection chip will be illustratively described below.

Before the chip works, the reservoir chamber 100 having a specific reagent sealed therein 100 is fixed to the bump 210 of the substrate 200 by threaded connection or clamped connection or in other fixed manners, and is coaxially aligned with the bump 210. For example, the bottom of the reservoir chamber 100 is bonded on the surface of the bump 210 to form a closed environment for later detection. The reservoir chamber 100 is designed to be modular, so that different reagent combinations and different dose combinations may be used when the chip is used for detecting different items to make detection data more accurate. In this embodiment, one substrate may be provided with multiple reservoir chambers for sealing different reagents, so that costs are reduced.

The reservoir chamber 100 comprises a support frame 130, and a first seal layer 110 and a second seal layer 120 for sealing the support frame 130. The support frame comprises a support frame body and a cavity formed in the middle of the support frame body, wherein a biochemical reagent is stored in the cavity in the support frame body and is sealed by the first seal layer and the second seal layer.

The first seal layer 110 is a flexible film made of polymer materials, has certain elasticity and strength, and is able to deform under an external drive force. The second seal layer 120 is a pre-deformed flexible composite film consisting of a polymer layer and a metal layer, wherein the polymer layer is flexible and ductile and endows the composite film with ductility and deformability, and the metal layer, as a support layer of the composite film, endows the composite film with certain plasticity, so that the second seal layer 120 can be maintained in the pre-deformed state for a long time. For example, the second seal layer 120 is a composite film consisting of a PE polymer layer and an aluminum film, wherein the thickness of the PE polymer layer is 0.005 mm, the thickness of the aluminum film is 0.003 mm, and in this case, the second seal layer 120 can be easily pierced and can be maintained in the shape at the moment it is pierced for a long time after it is pierced.

Furthermore, a needle tip structure is disposed on the surface of the substrate 200 and is located at the center of the cross-section shape of the connecting portion. It can be understood that the support frame 130 of the reservoir chamber, the bump 210 and the piercing structure should be coaxially aligned before the detection chip starts to work, and at this moment, the needle tip 220 exactly corresponds to a portion, deformed to the maximum extent, of the second seal layer.

As shown in FIG. 3, when the chip works, a force towards the interior of the reservoir chamber 100 is applied to the first seal layer 110 by means of the ejection rod 310, the first seal layer 110 is able to deform elastically to allow the ejection rod 310 to move by a certain distance, and then the second seal layer 120 is deformed under the effect of compressed air to turn from the concave shape to the convex shape; because the concave depth h1 of the second seal layer 120 is slightly greater than the distance h2 from the top end of the needle tip 220 to the surface, away from the substrate 200, of the bump 210, the second seal layer 120 is approximately a complete hemispherical structure after turning to be pierced; the second seal layer 120 has plasticity, so that it can be maintained in the deformed state for a long time after the force applied by the ejection rod 310 is removed, and the reagent in the reservoir chamber 100 is discharged along the hemispherical surface and flows into the detection chip along the break via the micro-channel opening in the needle tip 220, thus reducing reagent residues in the reservoir chamber 100 and realizing quantitative release of the reagent.

At least one embodiment of the disclosure provides a preparation method of a detection chip, comprising: a substrate is provided, wherein the detection chip may be the detection chip provided by any one embodiment mentioned above. Please refer to the description of the above embodiments for a detailed description of the detection chip, and unnecessary details will no longer be given here.

Figure 8:
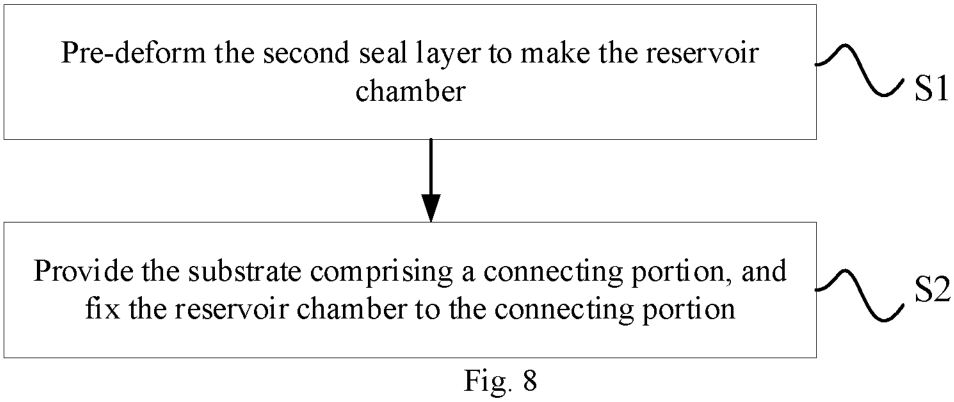
FIG. 8 is a flow diagram of a preparation method of a detection chip according to at least one embodiment of the disclosure.

For example, referring to FIG. 8, the preparation method of the detection chip according to at least one embodiment of the disclosure comprises:

S1: the second seal layer is pre-deformed to make the reservoir chamber; and S2: the substrate comprising a connecting portion is provided, and the reservoir chamber is fixed to the connecting portion.

Figure 5:
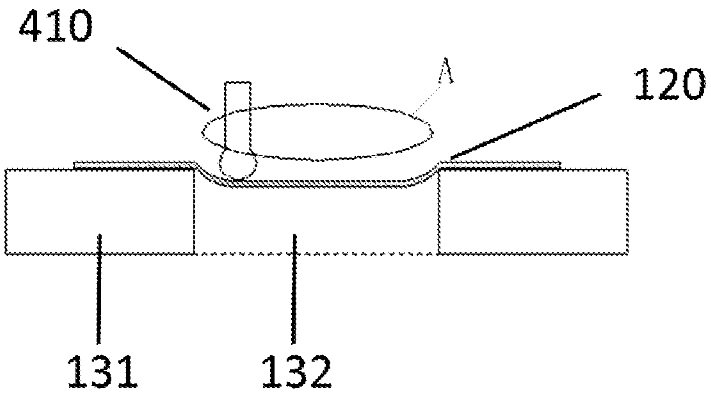
FIG. 5 is a schematic diagram for preparing a second seal layer of a detection chip according to at least one embodiment of the disclosure.

In some embodiments, the preparation method of the detection chip may further comprise: the second seal layer 120 of the reservoir chamber 100 is pre-deformed. Referring to FIG. 5, a method for pre-deforming the second seal layer 120 in this embodiment of the disclosure comprises: the second seal layer 120 is fixed to the support frame body 131 and covers the cavity 132; a slide bar 410 is suspended in a vertical direction of the second seal layer 120, and an end of the slide bar 410 presses against the second seal layer 120 and moves cyclically when the detection chip works, wherein the vertical direction is a direction perpendicular to the surface of the second seal layer 120; when the end of the slide bar 410 presses against the second seal layer 120 and moves cyclically, the second seal layer 120 is concaved to the bottom of the cavity 132.

The support frame 130 is a support member for fixing the second seal layer 120 and comprises a support frame body 131 and a cavity 132 formed in the middle of the support frame body 131. The second seal layer 120 is fixed to the support frame body 131 with glue or in other manners. The cavity 132 is formed in the middle of the support frame body 131, so that when the second seal layer 120 covers the cavity 132, a portion, covering the cavity 132, of the second seal layer 120 is suspended and will be concaved to the bottom of the cavity 132 under the effect of the slide bar to form an accommodating cavity for containing the biochemical reagent.

Optionally, the support frame body 131 is any one selected from a circular support, a rectangular support and a rhombic support. Specifically, in case where the support frame body 131 is a circular support, the contour of the second seal layer 120 is approximately hemispherical under the effect of the slide bar 410. It should noted that the shape of the support frame body 131 depends on the shape of the accommodating cavity to be formed by the second seal layer 120, and the embodiments of the disclosure have no limitation in this aspect.

Figure 6:
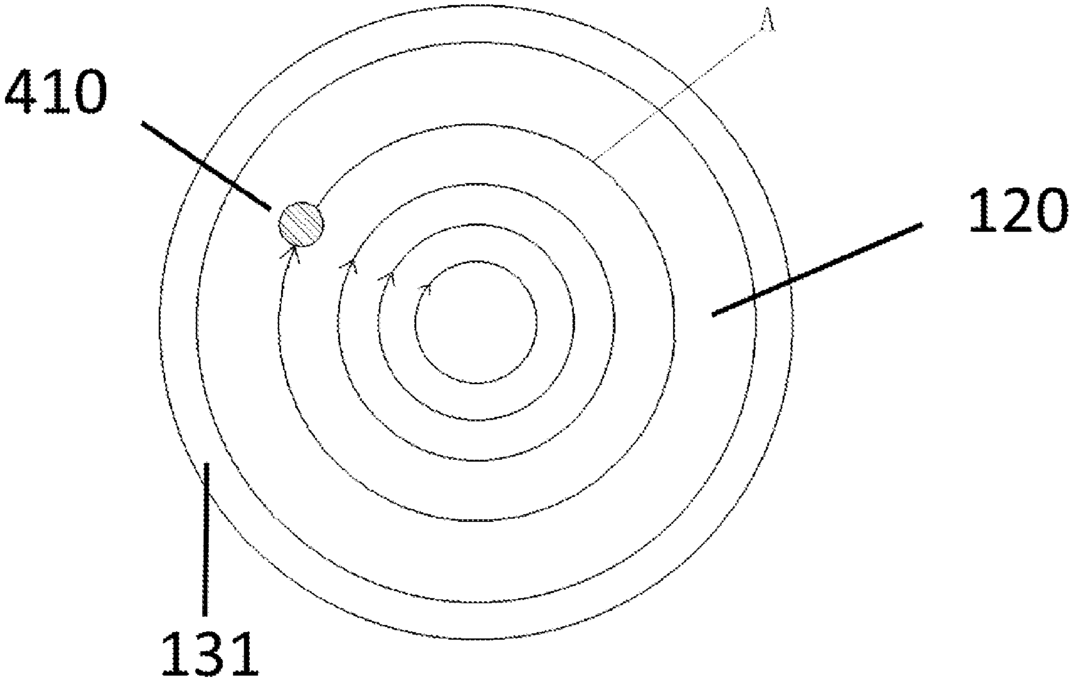
FIG. 6 is a schematic diagram of a motion track when a slide bar moves cyclically according to at least one embodiment of the disclosure.

In a possible embodiment, the slide bar 410 moves cyclically to form a circular track. Illustratively, the cavity 132 in the support frame body 131 may be a cylindrical cavity with a diameter of 16 mm, a thickness of 1 mm and a depth of 6 mm, the slide bar 410 makes a circular motion with a diameter of 10 mm by taking the center of the cavity 132 in the middle of the support frame body 131 as a rotation center, then moves downwards by 1 mm in the direction perpendicular to the surface of the second seal layer 120, and then makes a circular motion with a diameter of 8 mm by taking the center of the cavity 132 in the middle of the support frame body 131 as the rotation center, and so on. As shown in FIG. 6, the second seal layer 120 is pre-deformed into a hemisphere with a diameter of about 16 mm and a concave depth of 5 mm after four circular motions. In another possible embodiment, the slide bar moves cyclically to form a square track. Of course, the embodiments of the disclosure are not limited to this, and the second seal layer may be pre-deformed to be different shapes based on different sizes of the cavity and different motion tracks.

In some embodiments, the preparation method of the detection chip may further comprise: the second seal layer is pre-deformed by a hot-pressing or hot-extrusion process.

In some embodiments, the preparation method of the detection chip may further comprise: the second seal layer and the support frame are bonded by laser welding or with a binding agent. For example, when the second seal layer and the support frame are made of the same material (such as PS, PMMA, PC, PP or other polymer materials), the second seal layer and the support frame may be bonded by laser welding. When the second seal layer and the support frame are made of different materials, the seal layer and the support frame may be bonded with a binding agent. It can be understood that the second seal layer and the support frame may be bonded after the second seal layer is pre-deformed or before the second seal layer is pre-deformed.

Figure 7:
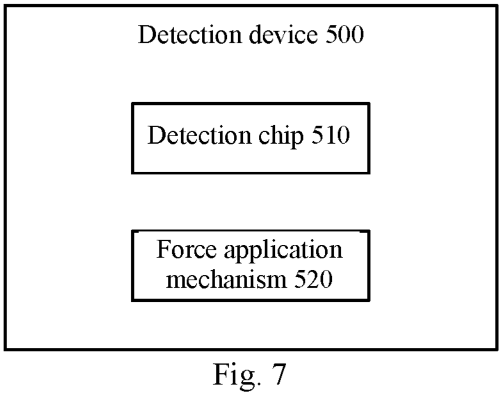
FIG. 7 is a schematic block diagram of a detection device according to at least one embodiment of the disclosure.

FIG. 7 is a schematic diagram of a detection device provided by at least embodiment of the disclosure. As shown in FIG. 7, the detection device 500 according to at least one embodiment of the disclosure may comprise:

A detection chip 510; and

A force application mechanism 520 configured to apply a force towards an internal space of the reservoir chamber to the first seal layer of the reservoir chamber of the detection chip during use to enable the second seal layer to deform to be pierced by the piercing structure to allow liquid contained in the internal space to flow into the micro-channel.

The detection chip may be the detection chip provided by any one embodiment mentioned above. The force application mechanism may be in any appropriate forms as long as it is capable of applying a force towards the reservoir chamber of the detection chip to destroy the second seal layer of the reservoir chamber of the detection chip. For example, the force application mechanism may comprise an ejection rod, as shown in FIG. 3. In case where a force towards to the interior of the reservoir chamber is applied to the first seal layer, the first seal layer is able to deform elastically to allow the ejection rod to move by a certain distance, then the second seal layer is deformed under the effect of compressed air to turn from the concave shape to the convex shape to be pierced by the piercing structure to form a break, and the reagent in the reservoir chamber is discharged along the hemispherical surface. The force application mechanism may be driven by a motor or be operated manually, and the embodiments of the disclosure have no limitation in this aspect.

It should be understood that the detection device 300 may further comprise other components such as a base allowing the detection chip to be placed thereon, a liquid waste disposal device, various analysis detectors, a liquid inlet/outlet, and a power port which are not shown in FIG. 3, all these components may be known parts in the art, and the embodiments of the disclosure has no limitation in this aspect.

At least one embodiment of the disclosure further provides a method for operating a detection chip, wherein the detection chip may be the detection chip provided by any one embodiment mentioned above. Please refer to the description of the above embodiments in the specification for a detailed description of the detection chip, and unnecessary details will no longer be given here.

For example, the method for operating the detection chip according to the at least one embodiment of the disclosure may comprise:

A force towards an internal space of the reservoir chamber is applied to the first seal layer of the reservoir chamber of the detection chip to enable the second seal layer to deform to be pierced by the needle tip to allow liquid contained in the internal space to flow into the micro-channel.

"One embodiment", "an embodiment" or "one or more embodiments" in this specification means that specific features, structures, or characteristics described in conjunction with said embodiment are included in at least one embodiment of the disclosure. In addition, it should be noted that the expression "in one embodiment" does not definitely refer to the same embodiment.

A great plenty of specific details are provided in this specification. However, it can be understood that the embodiments of the disclosure can be implemented even without these specific details. In some embodiments, known methods, structures and techniques are not stated in detail to ensure that the understanding of this specification will not be obscured.

The detection chip, the preparation method and use method thereof, and the detection device provided by the disclosure are introduced in detail above, specific examples are used in this specification to expound the principle and implementation of the disclosure, and the description of the above embodiments is merely used to assist those skilled in the art in understanding the method and core concept thereof of the disclosure. In addition, those ordinarily skilled in the art can make changes to the specific implementation and application scope based on the concept of the disclosure. So, the contents of the specification should not be construed as limitations of the disclosure.

The invention claimed is:

1. A detection chip, comprising:

a substrate comprising a piercing structure; and a reservoir chamber configured to contain a liquid and comprising a support frame, and a top seal layer and a bottom seal layer for sealing the support frame;

wherein the support frame comprises a support frame body and a cavity formed in a middle of the support frame body, and the bottom seal layer has plasticity and is configured to be pre-deformed to be concaved into the reservoir chamber before the reservoir chamber is used.

2. The detection chip according to claim 1, wherein a contour of the bottom seal layer is approximately shaped like a hemisphere that is concaved into the reservoir chamber.

3. The detection chip according to claim 2, wherein the bottom seal layer comprises a polymer layer and a metal layer.

4. The detection chip according to claim 3, wherein the bottom seal layer comprises an aluminum film and a PE polymer layer.

5. The detection chip according to claim 2, wherein the bottom seal layer comprises a metal film.

6. The detection chip according to claim 3, wherein the top seal layer is a flexible polymer film and is configured to deform when pressed.

7. The detection chip according to claim 4, wherein the PE polymer layer has a thickness of 0.001 mm to 1 mm, and the aluminum film has a thickness of 0.001 mm to 1 mm.

8. The detection chip according to claim 1, wherein the substrate further comprises a connecting portion that is configured to be connected to the reservoir chamber.

9. The detection chip according to claim 8, wherein the connecting portion comprises a bump with a circular cross-section, and a height of the bump is greater than a concave depth of the bottom seal layer.

10. The detection chip according to claim 9, wherein the piercing structure is a needle tip, and a distance from a top end of the needle tip to a surface, away from the substrate, of the bump is smaller than the concave depth of the bottom seal layer.

11. The detection chip according to claim 9, wherein the reservoir chamber is fixedly connected to the bump and is coaxially aligned with the bump.

12. The detection chip according to claim 8, wherein the piercing structure is located at a center of the cross-section shape of the connecting portion.

13. The detection chip according to claim 1, wherein the piercing structure is a needle tip.

14. The detection chip according to claim 1, wherein the piercing structure is formed with a micro-channel opening that is configured to be communicated with a micro-channel in the substrate.

15. The detection chip according to claim 1, wherein in case where the detection chip is used for immunological detection, the substrate is made of PS or PMMA; or in case where the detection chip is used for molecular detection, the substrate is made of PP or PC.

16. A detection device, comprising:

the detection chip according to claim 1; and a force application mechanism configured to apply a force towards an internal space of the reservoir chamber to the top seal layer of the reservoir chamber of the detection chip to enable the bottom seal layer to deform to be pierced by the piercing structure.

17. A method for operating the detection chip according to claim 1, comprising:

applying a force towards an internal space of the reservoir chamber to the top seal layer of the reservoir chamber of the detection chip to enable the bottom seal layer to deform to be pierced by the piercing structure.

18. A preparation method of the detection chip according to claim 1, comprising:

pre-deforming the bottom seal layer to make the reservoir chamber; and providing the substrate comprising a connecting portion, and fixing the reservoir chamber to the connecting portion.

19. The preparation method of the detection chip according to claim 18, wherein the step of pre-deforming the bottom seal layer comprises:

fixing the bottom seal layer to the support frame body to cover the cavity;

suspending a slide bar in a vertical direction of the bottom seal layer, wherein the vertical direction is a direction perpendicular to a surface of the bottom seal layer; and controlling the slide bar to move cyclically along a preset track to enable the bottom seal layer to be concaved into the cavity, wherein the preset track is a motion track of the slide bar after an end of the slide bar presses against the surface of the bottom seal layer.

20. The preparation method of the detection chip according to claim 18, further comprising:

pre-deforming the bottom seal layer by a hot-pressing or hot-extrusion process.

* * * * *